(12) United States Patent
DeRosa

(10) Patent No.: US 7,766,586 B2
(45) Date of Patent: *Aug. 3, 2010

(54) QUICK CHANGE POWER TOOL CHUCK

(76) Inventor: John L. DeRosa, 8507 Churchill Ct., Upper Marlboro, MD (US) 20772

( * ) Notice: Subject to any disclaimer, the term of this patent is extended or adjusted under 35 U.S.C. 154(b) by 0 days.

This patent is subject to a terminal disclaimer.

(21) Appl. No.: 11/074,744

(22) Filed: Mar. 9, 2005

(65) Prior Publication Data

US 2005/0184474 A1 Aug. 25, 2005

Related U.S. Application Data

(63) Continuation-in-part of application No. 10/347,591, filed on Jan. 22, 2003, now Pat. No. 6,880,832.

(60) Provisional application No. 60/432,638, filed on Dec. 12, 2002.

(51) Int. Cl.
B23B 31/02 (2006.01)

(52) U.S. Cl. .......... 409/232; 279/44; 279/43.1; 279/67

(58) Field of Classification Search .......... 279/33–35, 279/44–45, 43.1, 43.3, 46.2, 62; 409/231, 409/232, 182, 234; 408/238–240; 403/290, 403/312, 344
See application file for complete search history.

(56) References Cited

U.S. PATENT DOCUMENTS

| | | | | |
|---|---|---|---|---|
| 2,211,216 A * | 8/1940 | Oster | ......................... | 451/358 |
| 2,343,875 A * | 3/1944 | Schwartz | ..................... | 409/135 |
| 2,660,463 A * | 11/1953 | Briney, Jr. | ..................... | 403/164 |
| 3,125,903 A * | 3/1964 | Briney, Jr. et al. | .......... | 408/151 |
| 3,236,572 A * | 2/1966 | White, Sr. | ..................... | 384/541 |
| 3,489,191 A * | 1/1970 | Blevins | ................... | 144/134.1 |
| 4,053,252 A * | 10/1977 | Gersch | ....................... | 408/150 |
| 4,211,510 A * | 7/1980 | Hopkins | ..................... | 408/186 |
| 4,423,881 A * | 1/1984 | Whitehead | ................... | 279/62 |
| 4,630,656 A * | 12/1986 | Collins | ..................... | 144/154.5 |
| 4,775,269 A * | 10/1988 | Brix | ........................ | 408/239 R |
| 4,818,156 A * | 4/1989 | Bauer | ......................... | 408/150 |
| 4,824,298 A * | 4/1989 | Lippacher et al. | ........... | 408/240 |
| 4,836,723 A * | 6/1989 | Flammini | .................... | 409/141 |
| 4,958,840 A * | 9/1990 | Palm | ........................... | 279/62 |
| 5,096,212 A * | 3/1992 | Walsh | ......................... | 279/9.1 |
| 5,152,327 A * | 10/1992 | Shoda | ........................ | 144/48.1 |
| 5,224,230 A * | 7/1993 | Vanicsek et al. | ............... | 7/158 |
| 5,224,803 A * | 7/1993 | Lallier | ........................ | 409/131 |
| 5,305,525 A * | 4/1994 | Susnjara et al. | .......... | 29/898.07 |
| 5,330,299 A * | 7/1994 | Gates | ......................... | 409/138 |
| 5,342,154 A * | 8/1994 | Holzer | ........................ | 408/240 |
| 5,694,992 A * | 12/1997 | Kikuchi | ................. | 144/136.95 |
| 5,782,591 A * | 7/1998 | Wilkinson, Jr. | ............. | 409/131 |

(Continued)

Primary Examiner—Daniel W Howell
(74) Attorney, Agent, or Firm—Neil F. Markva

(57) ABSTRACT

An improved quick change power tool chuck is provided which is principally used on a wood working router but could also be used in many other power tool applications. Key features of the quick change chuck include the unique way that it secures the cutting bit from unwanted slippage, the large mechanical advantage thereof and the speed in which a cutting bit can be removed and replaced. The chuck can be aligned and attached to the power tool in the same manner that a standard collet is aligned and attached to the router spindle or to a router or other drive shaft in a number of different ways.

9 Claims, 7 Drawing Sheets

U.S. PATENT DOCUMENTS

| | | | |
|---|---|---|---|
| 5,902,080 A * | 5/1999 | Kopras | 409/182 |
| 5,944,327 A * | 8/1999 | Kanaan | 279/51 |
| 5,997,012 A * | 12/1999 | Brian | 279/43.5 |
| 6,048,260 A * | 4/2000 | Kopras | 451/358 |
| 6,079,917 A * | 6/2000 | Miksa et al. | 409/182 |
| 6,224,305 B1 * | 5/2001 | Huggins | 409/182 |
| 6,332,619 B1 * | 12/2001 | DeRosa | 279/76 |
| 6,350,087 B1 * | 2/2002 | Berry et al. | 409/131 |
| 6,880,832 B2 * | 4/2005 | DeRosa | 279/44 |
| 6,908,264 B1 * | 6/2005 | Gundy | 408/204 |

\* cited by examiner

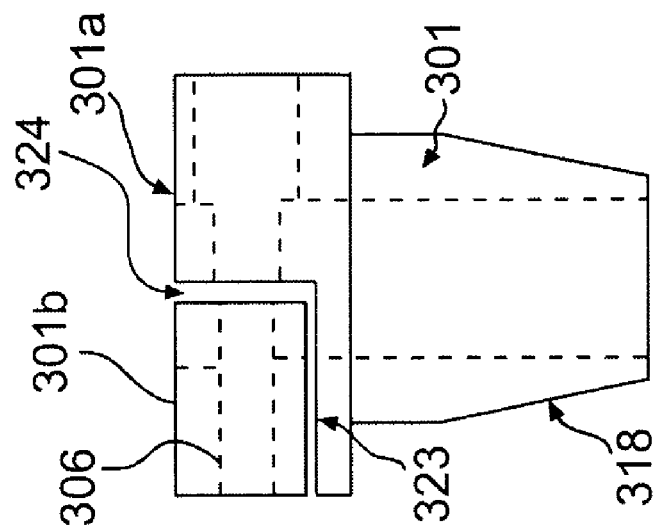
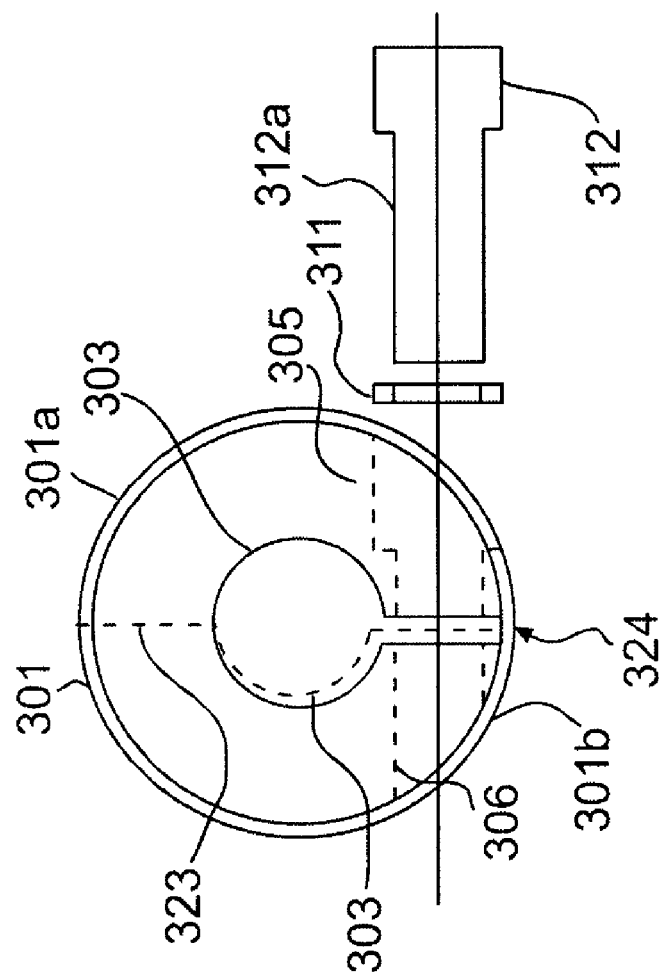

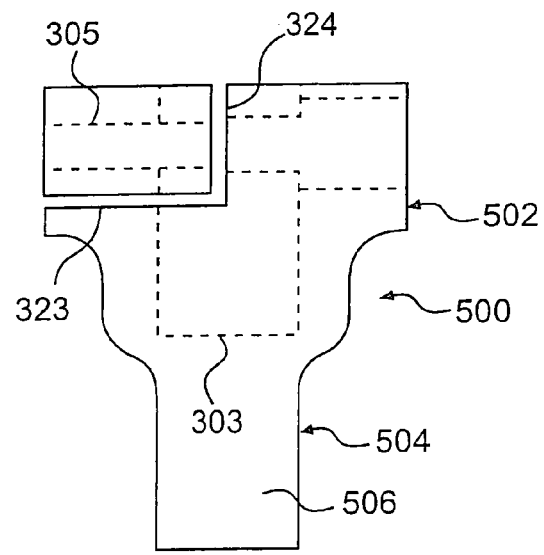
FIG. 5
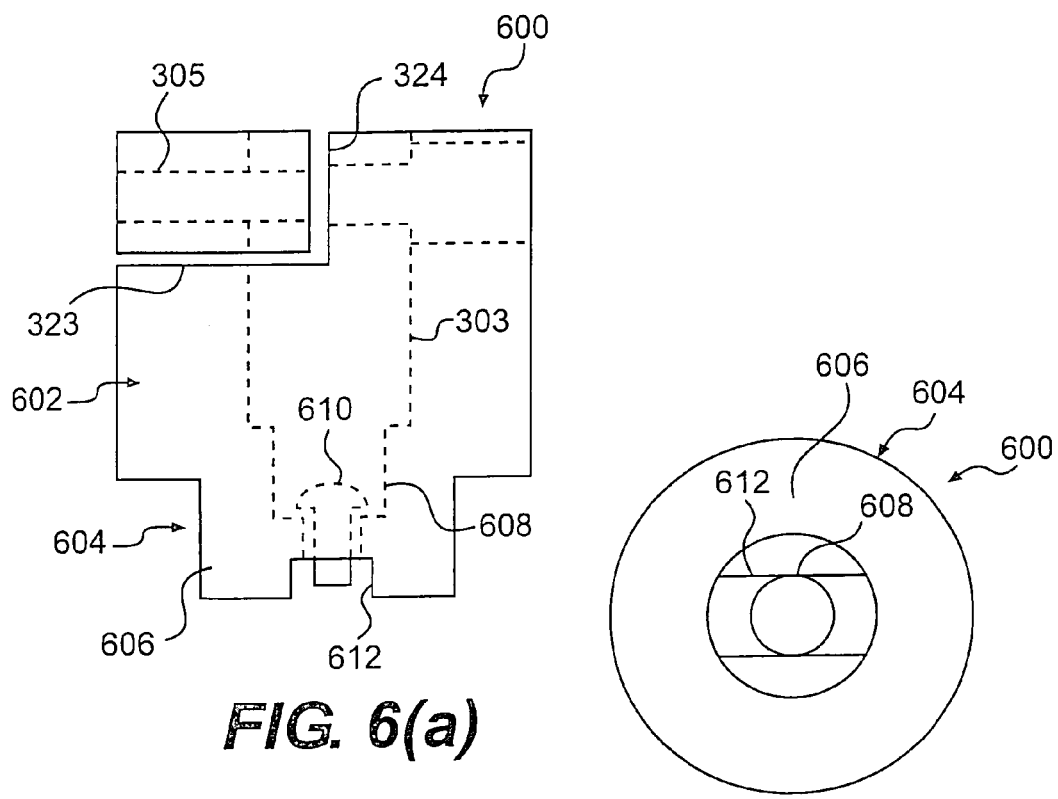
FIG. 6(a)   FIG. 6(b)

QUICK CHANGE POWER TOOL CHUCK

CROSS-REFERENCE TO RELATED APPLICATIONS

This application is a Continuation-In-Part of application Ser. No. 10/347,591 filed on Jan. 22, 2003, now U.S. Pat. No. 6,880,832, which itself claims benefit of the filing date of the Provisional Patent Application No. 60/432,638, filed Dec. 12, 2002.

BACKGROUND OF THE INVENTION

1. Field of the Invention

The present invention relates to quick change chucks for power tools and, more particularly, to an improved chuck that provides increased holding force without sacrificing ease of bit changing.

2. Discussion of Related Art

Although there are a number of existing chucks and like devices for retaining cutting bits in power tools and driven spindles, they all have some disadvantages which detract from their advantages. For example, while some chucks hold the cutting bit with enough force that slippage will not occur, the changing of the bit can be very cumbersome and time consuming. Others allow an easy changing of bits but do not provide enough holding torque to prevent slippage from occurring. There are a few chucks that allow easy changing of bits and also provide a reasonable amount of holding torque. However, at the present time, there are no chucks currently available which allow an easy change of the cutting bit and which also provide the increase in mechanical advantage necessary to enable a large enough force to be exerted on the cutting bit so as to substantially increase the holding torque. A chuck of this type would allow the power tool user to spin much larger cutting bits at higher speeds while still maintaining a substantially greater safety margin because of the increased holding force.

One chuck of particular interest here is that disclosed in U.S. Pat. No. 5,096,212 to Walsh. Although this chuck has advantages, there are several disadvantages to the chuck. By way of background, it is noted that routers are required to spin the cutting bit at a relatively high angular speed, typically above 20,000 rpms. Thus, the design of a router chuck has to be as lightweight and compact as possible for obvious reasons. Accordingly, if the chuck is relatively heavy and bulky in size as in the case of the chuck of the Walsh patent, unwanted and sometimes severe vibration can occur, resulting in an unsafe operating condition. Further, the chuck of the Walsh patent requires two cams which secure the tool essentially by pinching the tool shank. Since the cams are harder than the typical tool shank, an unwanted indentation in the tool shank can result if the cams are over-tightened. Another disadvantage of the Walsh chuck is that the manner in which the nut is attached to the body is inadequate. In this regard, although during the short time a chuck constructed as disclosed in the Walsh patent was distributed no failures were reported, the construction could have eventually led to catastrophic failure. Finally, the construction of the chuck of the Walsh patent employs some unnecessary parts, includes a relatively weak screw, and, in general, has the appearance of being cumbersome and awkward to use.

An improvement in the construction of quick change router chucks and the like is disclosed in U.S. Pat. No. 6,332,619 B1 to DeRosa. The genesis of this construction was an attempt to overcome all, or as many as possible, of the shortcomings of the Walsh chuck. The attempt was successful and the construction of the DeRosa chuck not only incorporates several improvements but has been manufactured and sold in quantity to the general public. One improvement is the use of only a single cam instead of two. The single cam was also modified and is allowed to slightly crush under pressure. However, while the cam maintains its holding power, it does not indent the tool shank. The nut is attached by the use of retaining rings which are much stronger and safer than the previously used pins. Among other advantages, the size of the chuck was greatly reduced by the elimination of one cam and a few unnecessary internal parts, and a stronger screw was incorporated. However, one disadvantage is that some of the holding power provided by the chuck had to be sacrificed by the use of the softer cam in eliminating the tool shank indentation problem created by the previous use of a harder cam.

SUMMARY OF THE INVENTION

An object of the present invention is to provide a chuck having greatly increased holding torque, without relying on set screws, flats, keys or any other such elements or configurations that are conventionally used to prevent angular slippage between the cutting bit and the chuck.

A further object of the present invention is to preserve the relative ease of bit changing and mounting to the motor tool or spindle that is characteristic of quick change chucks.

Another object of the present invention is to allow the spinning of much larger cutting bits more safely, by providing much stronger holding of the bit.

A further object of the present invention is to greatly improve the holding strength to weight ratio of the chuck in comparison to other existing quick change chucks.

An additional object of the present invention is to eliminate any internal parts that can wear out or fail over time but yet are critical to the operation of the chuck, such as cams, plates, and the like found in prior art chucks.

According to one aspect of the invention, there is provided a chuck device for holding a tool having a tool shaft or a connecting collet, said device comprising:

a chuck body including a central longitudinally extending bore therein of a predetermined circumferential shape for receiving the shaft or collet of the tool, and a pivotable portion movable between a rest position wherein the predetermined circumferential shape of the bore is maintained and there is no engagement between the pivotable portion and the shaft or collet of a tool received in the bore, and an operative position wherein a bore-facing surface of said pivotable portion extends inwardly into said bore so as to engage the shaft or collet of a tool received in said bore; and a fastener member, received in an aperture in said chuck body, for, in use, causing pivoting of said pivotable portion of said chuck body to a said operative position thereof so that the bore-facing surface of said pivotable portion engages the shaft or collet of a tool received in said bore, the chuck body being formed integrally with a main motor shaft of a motor-driven drive device, and said main motor shaft including an electrical armature affixed thereto.

Preferably, in the operative position of the pivotable member, the bore-facing surface of the pivotable member engages an appreciable or substantial amount of the outer circumferential surface of the shank or collet.

In one important embodiment, the pivoting portion is formed integrally with the chuck body. The chuck body preferably includes an annular portion including first and second orthogonal slots therein which divide said annular portion into said pivotable portion and a fixed portion. Preferably, the first slot extends inwardly from an end surface of the annular portion parallel to the longitudinal axis of the bore. Advantageously, the annular portion includes a circumferential surface defining the longitudinal thickness of the annular portion and first and second opposed end surfaces spaced apart by said thickness, the first slot extends into said first end surface of said annular portion for a distance greater than one half of said thickness and terminates short of said second end surface, and the second slot extends into the annular portion orthogonally to the first slot from said circumferential surface so as to terminate in said annular portion along a line a portion of which is substantially coextensive with the first slot.

In another important implementation, the chuck body comprises a main body portion and said pivotable portion comprises a pivot arm formed separately from said main portion and pivotably mounted thereon. Preferably, the arm is of a substantially U-shaped configuration having a first, pivoted end and a second, free end and defining said bore-facing surface between said first and second ends. Advantageously, the fastener element, in use, engages the free end of said arm to clamp said bore-facing surface of said arm against the shank or collet of a tool received in the bore. Preferably, the free end of said arm includes a threaded opening therein, and the fastener element comprises a cap screw including a threaded portion adapted to be screwed into the threaded opening.

In accordance with a further aspect of the invention, there is provided a chuck device, adapted to be driven by a drive shaft, for holding a tool having a tool shaft or a connecting collet, the device comprising:

a chuck body including a central longitudinally extending bore therein of a predetermined circumferential shape for receiving the shaft or collet of the tool, and a pivotable portion movable between a rest position wherein the predetermined circumferential shape of the bore is maintained and there is no engagement between the pivotable portion and the shaft or collet of a tool received in the bore, and an operative position wherein a bore-facing surface of said pivotable portion extends inwardly into said bore so as to engage the shaft or collet of a tool received in said bore; and a fastener member, received in an aperture in said chuck body, for, in use, causing pivoting of said pivotable portion of said chuck body to a said operative position thereof so that the bore-facing surface of said pivotable portion engages the shaft or collet of a tool received in said bore, the chuck body further including a proximal coupling portion for coupling the chuck device to the drive shaft, and said chuck device further comprising a coupling member adapted to be coupled to said proximal coupling portion.

Preferably, in the operative position of the pivotable member, the bore-facing surface of the pivotable member engages an appreciable or substantial amount of the outer circumferential surface of the shank or collet.

As above, in one important implementation, the pivoting portion is formed integrally with the chuck body, while in another, the pivoting portion comprises a separate pivot arm.

In one embodiment, the coupling member comprises a nut including a cylindrical side wall having internal screw threading and including a circumferential slot, wherein said coupling portion of said chuck body includes a circumferential slot in an outer surface thereof, and wherein said chuck device further includes at least one locking ring adapted to be received in the slots in said nut and said coupling portion of said chuck body so as to provide locking of said nut on said chuck body.

In another embodiment, the coupling member includes a tapered portion for engaging a reciprocally shaped tapered portion of said proximal coupling portion of said chuck body.

According to yet another aspect of the invention, there is provided a chuck device, adapted to be driven by a drive shaft, for holding a tool having a tool shaft or a connecting collet, the device comprising:

a chuck body including a central longitudinally extending bore therein of a predetermined circumferential shape for receiving the shaft or collet of the tool, and a pivotable portion, located at the distal end thereof and movable between a rest position wherein the predetermined circumferential shape of the bore is maintained and there is no engagement between the pivotable portion and the shaft or collet of a tool received in the bore, and an operative position wherein a bore-facing surface of said pivotable portion extends inwardly into said bore so as to engage the shaft or collet of a tool received in said bore; and a fastener member, received in an aperture in said chuck body, for, in use, causing pivoting of said pivotable portion of said chuck body to a said operative position thereof so that the bore-facing surface of said pivotable portion engages the shaft or collet of a tool received in said bore, the chuck body including an integral coupling portion located at the proximal end thereof and shaped so as to mate with a reciprocally shaped portion of the drive shaft.

In one embodiment, the coupling portion includes an integral male shank.

In another embodiment, the coupling portion includes a shaped recess adapted to receive a reciprocally shaped male portion of the drive shaft. Preferably, the bore in said chuck body includes a counterbore at the proximal end thereof for receiving an attachment bolt for attaching the chuck body to the male portion of the drive shaft. Preferably, the recess is shaped so as to prevent relative axial rotation between the chuck body and the drive shaft.

Further features and advantages of the present invention will be set forth in, or apparent from, the detailed description of preferred embodiments thereof which follows.

BRIEF DESCRIPTION OF THE DRAWINGS

FIGS. 3(a) and 3(b) are an exploded end elevational view and side elevational view, respectively, of the main body of FIG. 1 showing the slits in the main body that allow the clamping of the tool bit.

FIG. 5 is a side elevational view of a further embodiment of the invention;

FIG. 6(a) is a side elevational view of yet another embodiment of the invention;

FIG. 6(b) is an end view, drawn to an enlarged scale, of the coupling portion of the chuck device of FIG. 6(a);

DESCRIPTION OF THE PREFERRED EMBODIMENTS

Figure 1:
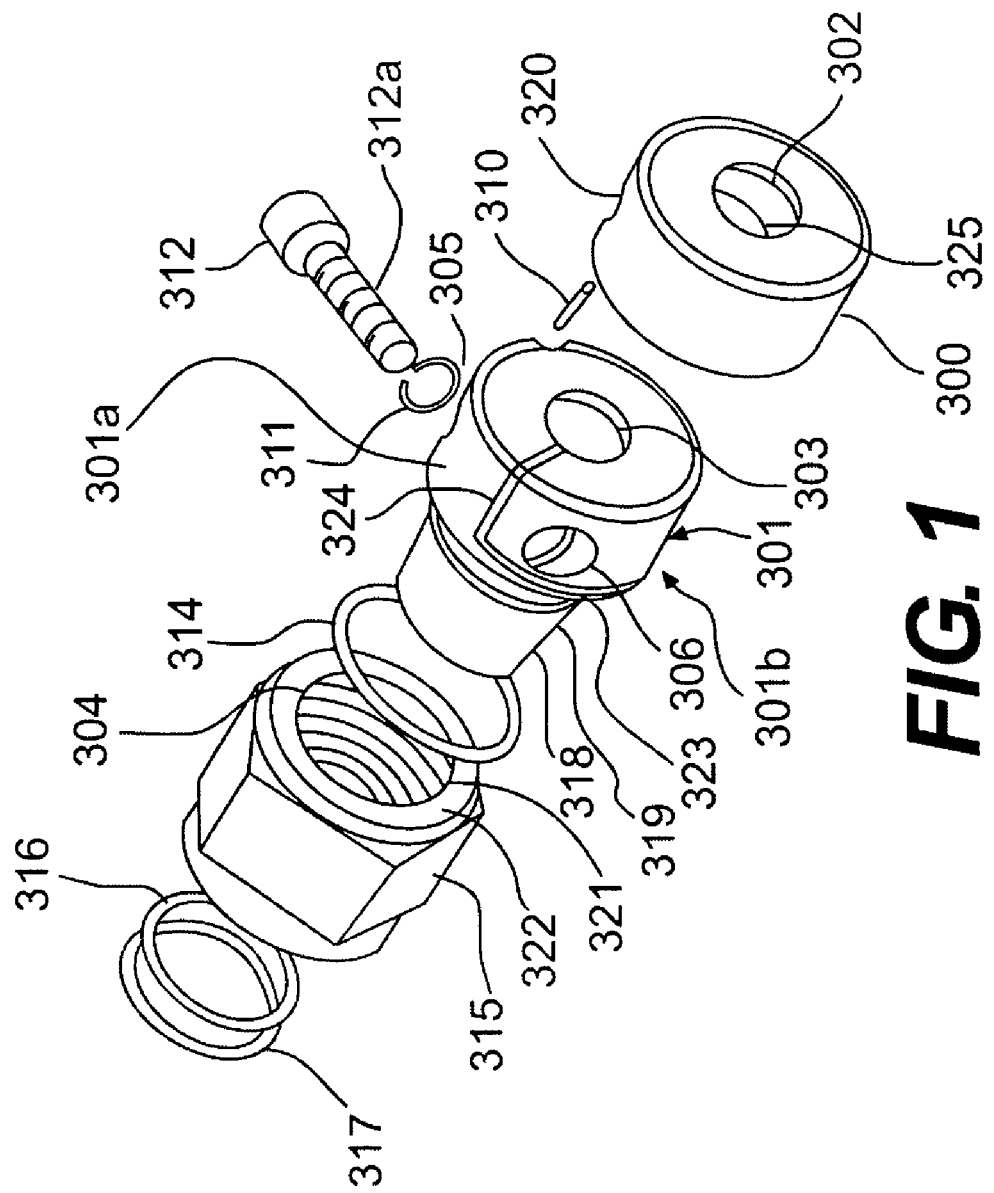
FIG. 1 is an exploded perspective view of a preferred embodiment of the chuck assembly of the present invention.
Figure 2:
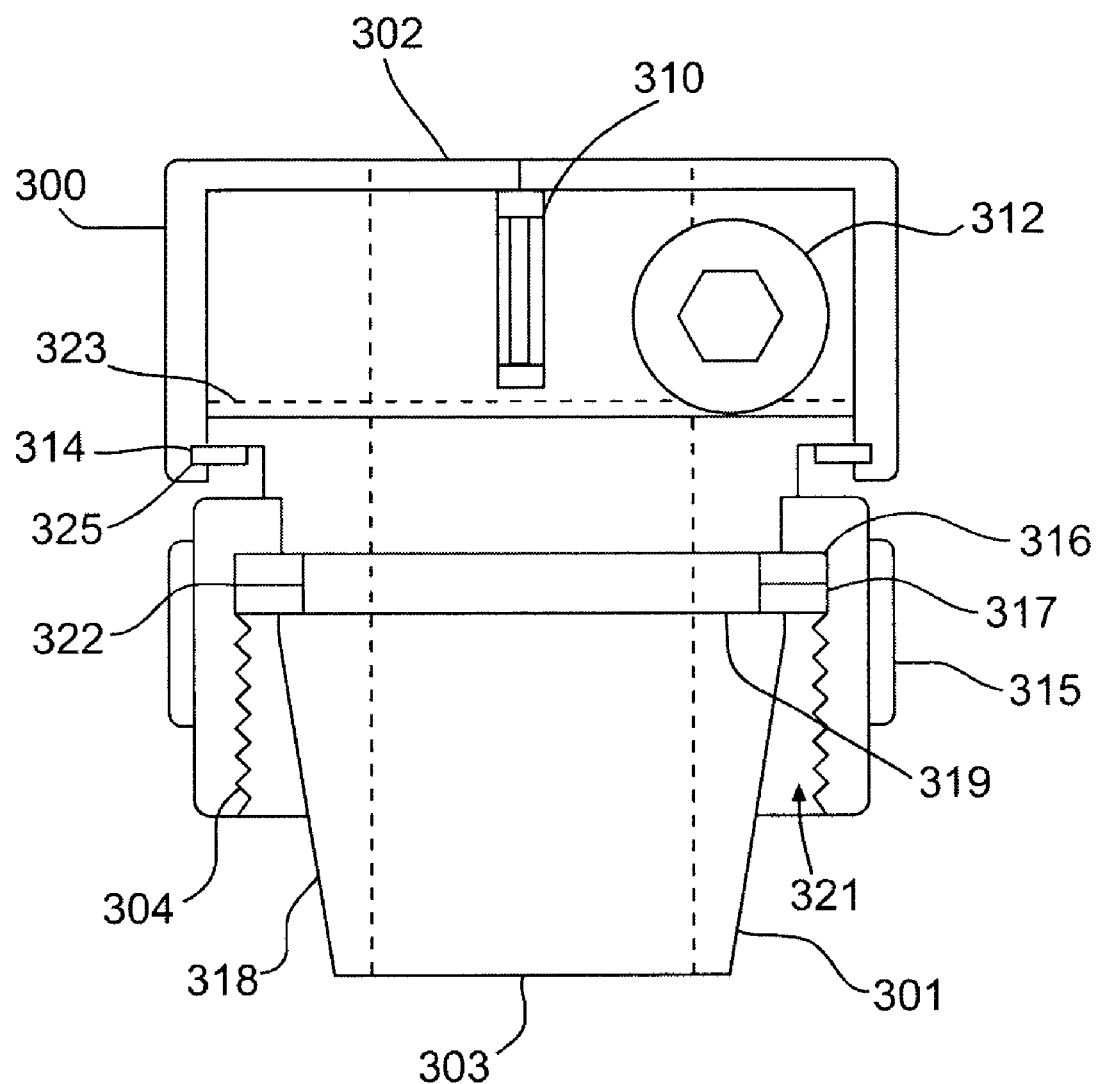
FIG. 2 is a side elevational view, partially in section, of the assembly of FIG. 1.

FIG. 1 shows an exploded perspective view of a preferred embodiment of the chuck device of the invention while FIGS. 2, 3(a) and 3(b) show various features of this embodiment.

The chuck device is composed of nine parts as shown in FIG. 1, viz., a safety cover 300, a main body 301, a pin 310, a washer 311, a cap screw 312, a lock ring 314, a nut 315, and two further lock rings 316 and 317.

In accordance with a key feature of the invention, the main body 301 is adapted to be mechanically deformed by the incorporation thereof of two slots 323 and 324 that extend perpendicular to each other. These slots are perhaps best seen in FIG. 3(b) and, as shown, divide an annular end portion of main body 301 into a fixed part or side 301a and a movable part or side 301b. As illustrated in FIG. 3(a), slot 323 extends inwardly from the circumferentially extending side surface of main body 301 so as to terminate in the main body 301 along a line (indicated by the dashed line 323) a portion of which is coextensive with orthogonal slot 324. Slots 323 and 324 thus create a movable or pivotable portion 301b of main body 301 which is capable of pivotable movement or flexing about the base portion thereof if sufficient force is applied thereto. Thus, when the cap screw 312 is tightened against the fixed side 301a of the cam body 301, the opposite side 301b of the body 301 defined by the slots 323 and 324 can flex and translate. Main body 301 includes a central aperture 303, and the inward translation of pivotable part 301b causes a slight inward distortion of the central aperture 303, as is indicated in dashed lines in FIG. 3(a). This enables a large clamping force to be applied to a tool shank or collet (not shown) which has been inserted into the main aperture 303 of the device.

Considering this clamping operation in more detail, the main body 301 also includes a further aperture 305, which extends perpendicular to central aperture 303. As indicated above, aperture 303 allows placement of the tool shank (not shown) into the slightly deformable main body 301, whereas aperture 305 allows insertion therein of the cap screw 312, through the washer 311. Cap screw 312 includes a threaded portion 312a adapted to engage to threads 306 of aperture 304. When the threaded portion 312a of cap screw 312 is tightened onto threads 306, cap screw 312 pulls the deformable part 301b of the body 301 against the tool shank or collet (not shown) thereby exerting a large force circumferentially on the tool shank or collet. A large mechanical advantage is obtained by applying the force tangentially to the deformable body 301 with cap screw 312. The arrangement of deformable part 301b is such that the inner, bore-facing surface of deformable portion 301b engages substantially one-half of the outer surface of the shank or collet and the main body 301 forms almost a complete "noose" around the tool shank so that the tool is held almost completely around the circumference of the tool shank. It will be understood that although in this embodiment the bore-facing surface of deformable portion 301b engages substantially one-half of the outer surface of the shank or collet, a lesser portion of the shank or collect can be engaged and still provide the noose effect. Moreover, because of deformation of the parts, it is difficult to measure the portion engaged, particularly with small parts, and, in general, the portion engaged should be appreciable and, as stated, substantially enough to provide the noose effect.

It will be appreciated from the foregoing that disengagement of the tool shank is readily achieved. In this regard, when cap screw 312 is loosened, the deformable part 301b of body 301 springs back to its relaxed or rest position, thereby freeing the tool shank to be removed.

As best seen in FIG. 2, the pin 310 is used to align the safety cover 300 which covers the main deformable body 301 with the body 301 itself and, to this end, opposite ends of pin 310 are received in respective apertures in cover 300 and main body 301. Cover 300 also contains a central aperture 302 which allows the tool shank to be inserted into aperture 303.

Pin 310 also allows aperture 305 and a further aperture 320 (see FIG. 2) provided in the side wall of cover 300 to be aligned so that the cap screw 312 and the washer 311 can be inserted into aperture 305 and engaged with threads 306.

After the safety cover 300 has been placed in position over the deformable main body 301, the locking ring or lock ring 314 is inserted into the bottom of safety cover 300 and into a groove 325 (see FIG. 2) which is formed in the inner circumference of cover 300 so that ring 314 and groove 325 function as a permanent retention device.

The alignment of the main tool aperture 303 with respect to the driven tool spindle (not shown) is accomplished in the usual, standard manner by the use of a taper section 318 formed on the body 301. The constructional details of the tapered section 318 will change according to the requirements of the particular geometrical configuration of the driven tool spindle. For example, parameters such as the taper angle, diameter, and length will be made to match the configuration of the driven tool spindle.

Turning to nut 315, and the manner of connection thereof, to main body 301, the aforementioned locking rings or lock rings 316 and 317 are inserted into the nut 315. More particularly, the lock rings 316 and 317 are placed into an internal retaining groove 322 located inside of the nut 315. The tapered section or portion 318 of the main body 301 is pushed into a central aperture 321 in nut 315 as shown in FIG. 2, thus allowing the locking rings 316 and 317 to expand and snap into a circumferential groove 319 in tapered portion 318, thereby permanently attaching the nut 315 to the main body 301.

After the placement of the nut 315 is completed, the locking ring 314 becomes totally inaccessible and disassembly of the chuck becomes impossible unless the chuck is destroyed or otherwise rendered inoperable. This is a safety feature that eliminates unwanted tampering with the chuck device.

Finally, the chuck device is inserted into the driven tool spindle 26 and retained thereon by the use of threads 304 located on the inside circumferential surface of nut 315. The nut 315 is then tightened onto the driven tool spindle thereby pulling the tapered section 318 of the main body 301 against the matching spindle taper, thereby securing the chuck device to the spindle. After the chuck device has been installed onto the router or other spindle, the chuck device is ready to accept cutting tools and otherwise ready to use.

Figure 4:
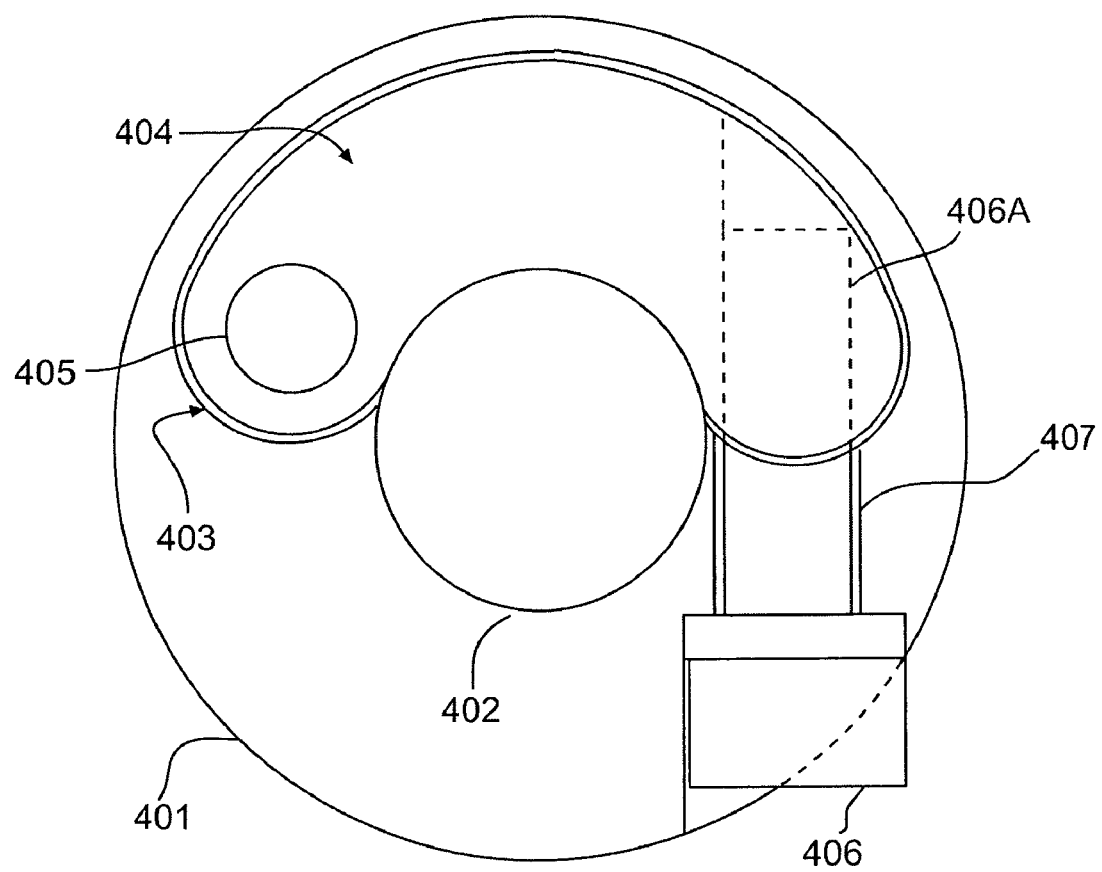
FIG. 4 is an end elevational view of the main body in accordance with an alternative embodiment for clamping of the tool bit.

Referring to FIG. 4, an alternative embodiment of the invention is shown. This embodiment is similar to that of FIG. 1 and the description here will basically focus on the differences between this embodiment and that of FIG. 1. In FIG. 4, a main body 401 includes a conventional central bore 402, and also includes a milled cavity 403 which receives a rotating or pivoting arm 404.

Arm 404 pivots around a pin 405 secured to main body 401 within cavity 403. Arm 404 is of a generally U-shaped construction, as illustrated, so that the inner curved surface thereof can engage the tool shank (not shown) received in bore 402. The free end of arm 404 is engaged by a threaded portion or section 406a of a cap screw 406 which is received, with a suitable clearance, in a bore 407 in main body 401. Cap screw 406 is thus used to control tightening and loosening of the engagement between the inner surface of arm 404 and the tool shank or collet (not shown).

It is noted that in both embodiments described above the cap screw (312 or 406) screws into the movable or pivotable portion from the fixed portion but it will be understood that the cap screw (or other tightening element) can also screw into the fixed portion from the pivotable portion.

Figure 9:
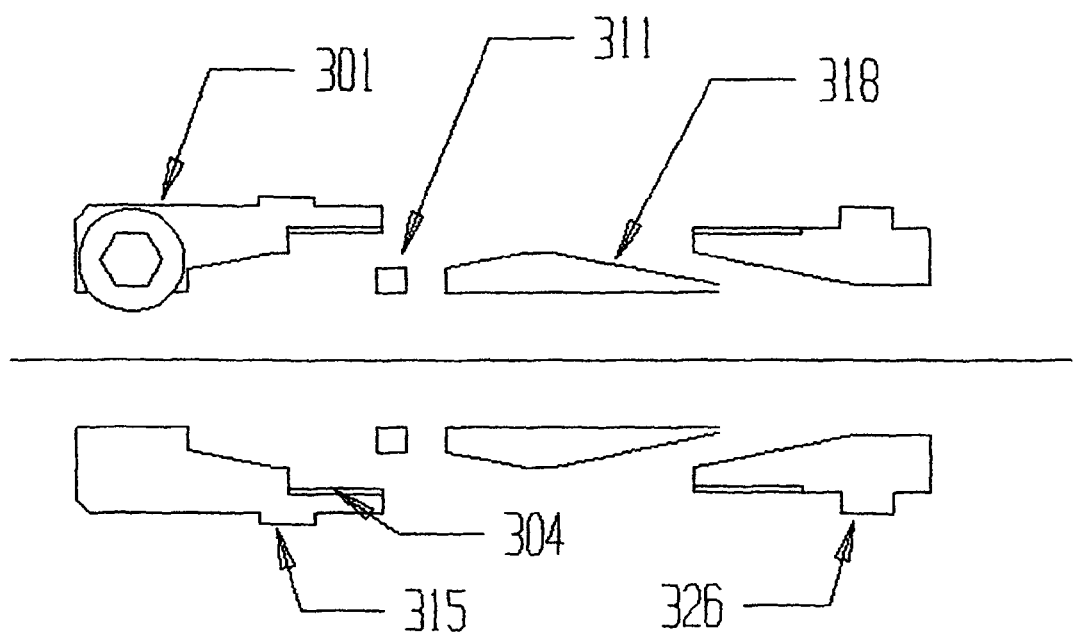

It will, of course, be appreciated that the mounting arrangement for mounting the chuck on the router shaft can be different from that illustrated in FIGS. 1 and 2. Some examples were mentioned above. In another example (See FIG. 9), nut 315 including teeth 304 can be formed as an integral part of the main body 301, and the tapered portion or section 318 of main body 301 can be a separate element forming a collet. Further, this separate collet can be a double angle or double taper construction rather than single taper construction shown in FIGS. 1 and 2. With this arrangement, the second taper of the separate collet would engage the abovementioned matching tapered inner wall of the router spindle 326. One or more washers 311 would be used between the "integral" nut and the "separate" tapered collet and thus not allowing the assembly to loosen and vibrate.

Referring to FIG. 5, a further embodiment of the invention is shown. In this embodiment, a chuck 500 is provided which includes a deformable head portion 502 constructed in the same way as the distal end portion of the main body 301 of FIGS. 1, 2, 3(a) and 3(b). Because of this similarity, the corresponding elements of head portion 502 have been given the same reference numerals. These elements include a central aperture or bore 303, orthogonal slots 323 and 324, and a transverse bore 305 adapted to receive cap screw 312 (not shown in FIG. 6). The construction of head portion 502 is otherwise as described above and will not be described further. Moreover, it will be understood that head portion 502 could also be of the construction shown in FIG. 4.

In the embodiment of FIG. 5, a proximal end portion 504 of chuck 500 comprises a simple male shank 506 which is adapted to slide into a collet (not shown) of an associated router (not shown) of a type that includes this kind of coupling assembly, i.e., one which is adapted to receive a male shank. Thus, the basic difference between this embodiment and those described above concerns the provision of the simple male shank 506 in place of the connecting assembly described previously.

Referring to FIGS. 6(a) and 6(b), there is shown a chuck 600 constructed in accordance with a further embodiment of the invention. Again, in this embodiment, head portion 602 is similar to that of the embodiment of FIGS. 1 and 2, like reference numerals have been used in the figures, and this embodiment will only be described relative to the differences.

In the embodiment of FIGS. 6(a) and 6(b), the proximal end 604 of chuck 600 includes a coupling portion 606 and the bore 303 includes a counterbore 608 for receiving a connecting bolt 610. This embodiment is adapted to couple to routers (not shown) which include an upstanding or outwardly extending coupling element (not shown) that would be received in a slot 612 in the end of coupling portion 606. Bolt 610 is used to secure chuck 600 to this coupling element (not shown) of the associated router (not shown).

Referring to FIG. 6(b), which is drawn to an enlarged scale, and is an end view of the coupling portion 606 of FIG. 6(a), the slot 612 is formed so as to be of a width equal to that of the aforementioned outwardly extending coupling element (not shown) of the router (and, in this case, also equal to the diameter of the lower portion of counterbore 608), and thus this construction acts as a spline in preventing relative rotation between the chuck 600 and the router. It will, of course, be appreciated that other kinds of conventional rotation-preventing couplings of different shapes (polygonal, circular, etc) can also be employed for this purpose. It should also be understood that while a female-male coupling has been described the coupling could also be male-female, i.e., with the male member on the coupling portion 606 of the chuck 600.

Figure 7:
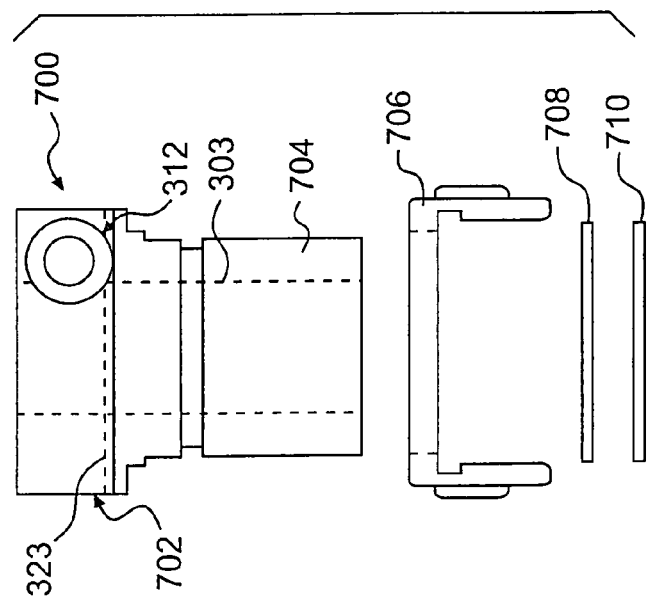
FIG. 7 is an exploded side elevational view of still another embodiment of the invention.

Referring to FIG. 7, there is shown a chuck 700 in accordance with yet another embodiment. This embodiment is similar to that of FIGS. 1 and 2 and the head or distal portion 702 of chuck 700 will not be discussed further. In this embodiment, the proximal portion 704 is cylindrical (rather than tapered) and chuck 700 is connected to the associated router shaft (not shown) by an associated cylindrical nut 706 having straight, i.e., non-tapered, sides, and a pair of O-rings 708, 710.

Figure 8:
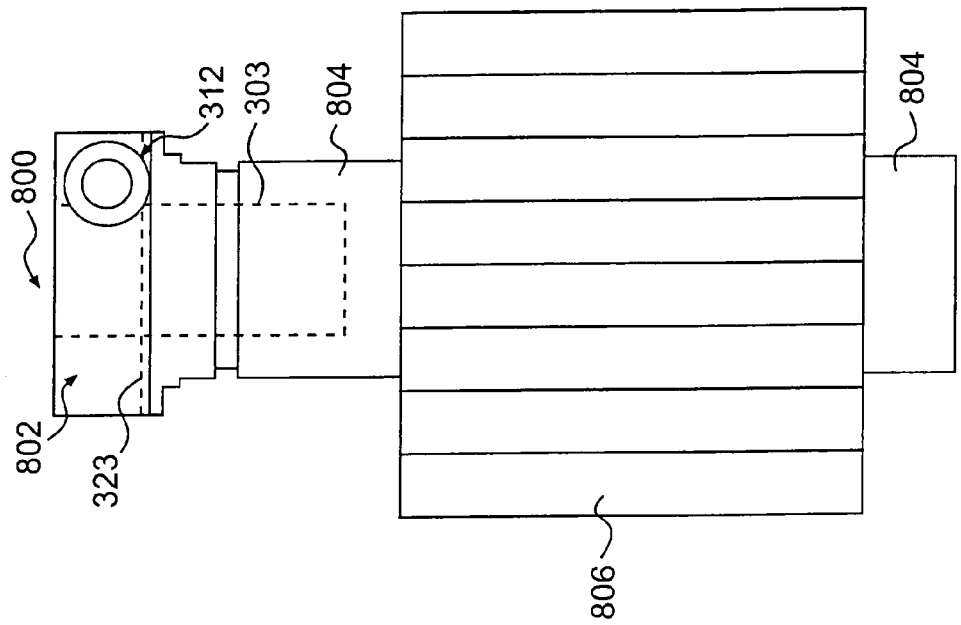
FIG. 8 and FIG. 9 are side elevational views of further embodiments of the invention.

Referring to FIG. 8, there is shown a chuck 800 in accordance with a further embodiment of the invention. The distal or head end 802 of chuck 800 is again the same as described above and will not be described further. This embodiment is distinguished by the fact that chuck 800 is formed integrally with the main motor shaft 804 of a router, with shaft 804 having an associated electrical armature 806 affixed or attached thereto. There are a number of commercial routers including a main motor shaft of this type including the shop router, Model No. 0601617739, made by Bosch Industrial. Thus, in this embodiment, the router (not shown) is made with the integral chuck 800, i.e., the chuck 800 is not a separate unit as in the other embodiments.

Although the invention has been described above in relation to preferred embodiments thereof, it will be understood by those skilled in the art that variations and modifications can be effected in these preferred embodiments without departing from the scope and spirit of the invention.

What is claimed:

1. A router chuck device for holding a tool having a tool shaft or a connecting collet, said device comprising:

A chuck body including a central longitudinally extending bore therein of a predetermined circumferential shape for receiving the shaft or collet of the tool, and a pivotable portion moveable between a rest position wherein the predetermined circumferential shape of the bore is maintained and there is no engagement between the pivotable portion and the shaft or collet of the tool received in the bore, and an operative position wherein a bore-facing surface of said pivotable portion extends inwardly into said bore so as to engage the shaft or collet of the tool received in said bore; and a fastener member, received in an aperture in said chuck body, for, in use, causing pivoting of said pivotable portion of said chuck body to said operative position thereof so that the bore-facing surface of said pivotable portion engages the shaft or collet of the tool received in said bore;

Said chuck body including a tapered portion through which said bore extends and wherein said chuck device comprises a nut adapted to be affixed to said tapered portion; and Wherein said chuck body is formed integrally with a main motor shaft of a motor-driven drive device, and said motor shaft including an electrical armature affixed thereto.

2. A router chuck device according to claim 1 wherein said pivotable portion is formed integrally with the chuck body.

3. A router chuck device according to claim 2 wherein said chuck body includes an annular portion including first and second orthogonal slots therein which divide said annular portion into said pivotable portion and a fixed portion.

4. A router chuck device according to claim 3 wherein said first slot extends inwardly from an end surface of the annular portion parallel to the longitudinal axis of the bore.

5. A router chuck device according to claim 3 wherein said annular portion includes a circumferential surface defining the longitudinal thickness of the annular portion and first and second opposed end surfaces spaced apart by said thickness, wherein said first slot extends into said first end surface of said annular portion for a distance greater than one half of said thickness and terminates short of said second end surface, and wherein said second slot extends into said annular portion orthogonally to said first slot from said circumferential surface so as to terminate in said annular portion along a line a portion of which is substantially coextensive to the first slot.

6. A router chuck device according to claim 1 wherein said chuck body comprises a main body portion and said pivotable portion comprises a pivot arm formed separately from said main portion and pivotably mounted thereon.

7. A router chuck device according claim 6 wherein said arm is of a substantially U-shaped configuration having a first, pivoted end and a second, free end and defining said bore-facing surface between said first and second ends.

8. A router device according to claim 7 wherein said fastener element, in use, engages the free end of said arm to clamp said bore-facing surface of said arm against the shank or collet of a tool received in said bore.

9. A router chuck device according to claim 8 wherein said free end of said arm includes a threaded opening therein, and wherein said fastener element comprises a cap screw including a threaded portion adapted to be screwed into said threaded opening.

* * * * *